June 9, 1953     H. G. FLEISCHHAUER     2,641,280
AUTOMATIC CONTROL VALVE FOR BRANCH PIPE LINES
Filed June 23, 1948     2 Sheets-Sheet 2

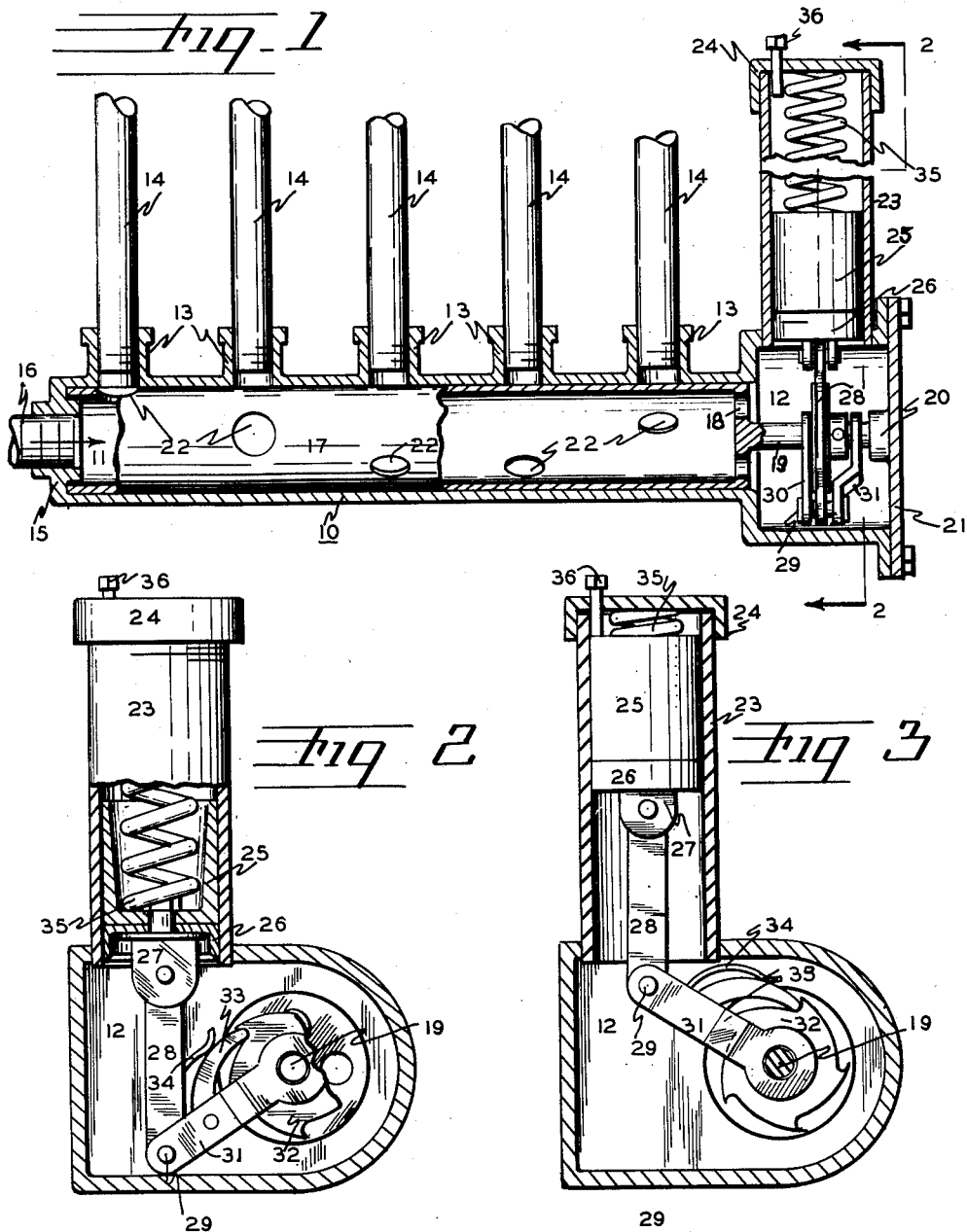

INVENTOR.
HENRY G FLEISCHHAUER
BY
ATTORNEY

Patented June 9, 1953

2,641,280

UNITED STATES PATENT OFFICE 2,641,280

AUTOMATIC CONTROL VALVE FOR BRANCH PIPE LINES

Henry G. Fleischhauer, Portland, Oreg.

Application June 23, 1948, Serial No. 34,792

4 Claims. (Cl. 137—625)

This invention relates in general to means for controlling the passage of fluid through a pipe line system consisting of a main delivery pipe and a plurality of branch pipes connected therewith, and more, specifically, relates to selective control of the fluid delivery through the individual branch pipes.

This invention relates particularly to irrigation or sprinkling installations in which the water is supplied from a main service pipe through a plurality of branch pipes, and where, due to insufficient supply and pressure, it is not desirable to permit the water to pass through more than one branch pipe or group of branch pipes at a time. For example, in sprinkling systems for lawns and the like, it is often necessary to arrange the system so that different sections are supplied by separate branch water pipe lines, each connected to the main water delivery pipe line, and to provide suitable control means to restrict the passage of the water through one branch pipe line at a time, and thereby enable the water to be used for irrigating or sprinkling each section in turn.

Various, more or less automatic, control means for operating sets of valves designed to serve such a purpose have been invented, but, to the best of my knowledge, these are too complicated and expensive for the average home owner or small gardener or small farmer. Furthermore, some of these depend upon electric timing devices which do not permit any variation in the predetermined length of sprinkling periods for different portions of the garden. Often it may be desirable to make comparative variations in the sprinkling periods so as to enable longer sprinkling to take place in one section of the lawn or garden and less sprinkling in another section on account of special conditions. Some of the complicated control means previously invented, in addition to being expensive to manufacture and install, also easily get out of order, and this is another reason why they have not met with more favor on the part of individual home owners or those engaged in farming and gardening on a small scale.

One of the objects of the present invention is to provide an improved control for branch pipe lines which will be automatically controlled by the turning on and off of the valve in the main pipe line (which main pipe line valve may be operated in any manner, thus manually, or by remote control, or by electrical, mechanical, or hydraulic means), and which will also be operated entirely by fluid pressure within the pipe line system.

Another object of this invention is to provide a practical branch pipe control means which will be partly automatic in its operation to the extent that delivery through each branch pipe successively will occur in predetermined order, but in which the length of the period of the permitted flow through each branch pipe can be varied as desired and will depend merely upon the control of the main pipe line valves.

An additional object of this invention is to provide a simplified branch pipe control system, of the type above indicated, which will be inexpensive to manufacture, easy to install, requiring little space, and necessitating only a minimum of care in its maintenance, and thus particularly suitable for sprinkling systems for medium sized lawns and gardens.

These objects and other incidental advantages I attain by the employment of simple devices by means of which the turning on and off of the water, or other fluid, in the main supply pipe line will automatically result in the turning on or off of each branch pipe consecutively; the various parts being combined and arranged and functioning as hereinafter briefly described. In the following description reference is made to the accompanying drawings in which:

Fig. 1 is a sectional elevation taken longitudinally through my control;

Fig. 2 is a transverse section corresponding to line 2—2 of Fig. 1, illustrating the position of the operating piston when the passage of water or fluid through the main pipe line has been shut off;

Fig. 3 is a similar section illustrating the position of the piston when the water or fluid is being delivered from the main pipe line and thence through one of the branch pipes;

Figure 4:
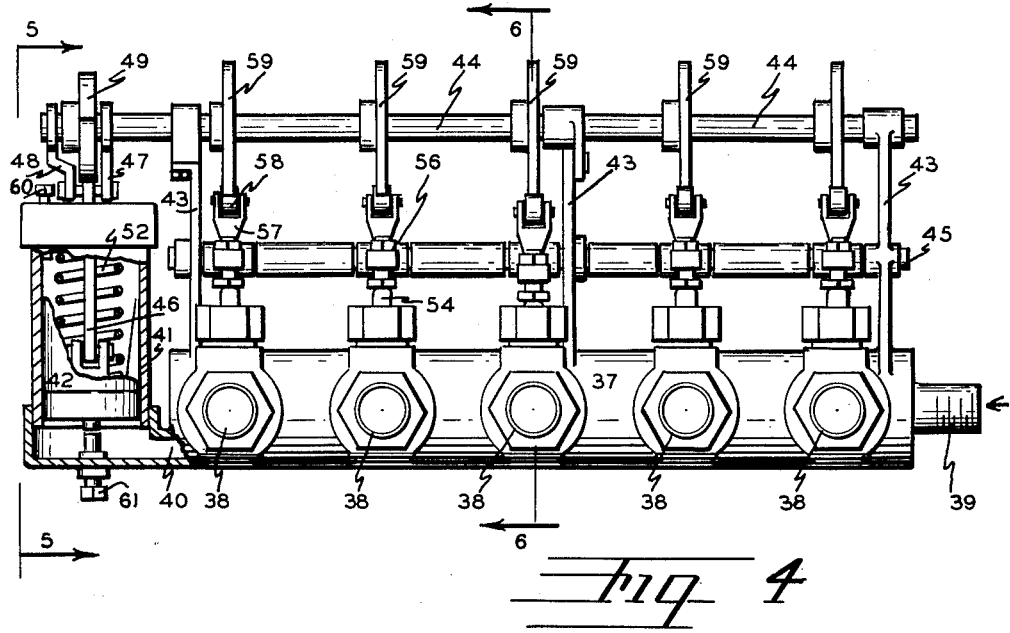
Fig. 4 is an elevation of a modified construction in which my invention can be carried out, a portion of the operating cylinder being shown broken away.

Referring first to Fig. 1, a housing 10 is formed with a main cylindrical chamber 11 and an enlarged end chamber 12. Internally threaded nipples 13 are arranged in longitudinal alignment along the cylindrical chamber 11 and serve to connect the chamber 11 with a series of branch pipes 14. A similar, though larger, internally threaded nipple 15 connects the chamber 11 with the main supply pipe line 16.

A hollow cylinder valve 17 is rotatably mounted within the cylindrical chamber 11 and extends the full length thereof. The cylindrical valve 17 at one end is formed with an open spider 18 from which an integral axially-alined shaft 19 extends. The end of the shaft 19 has a bearing in a boss 20 on the inner face of an end plate 21. The plate 21 serves as a closure for the end of the enlarged chamber 12. The other end of the cylindrical valve 17 is left entirely open. The cylindrical valve is provided with a series of ports 22, one for each of the branch pipes 14, which are arranged in symmetrical, staggered, equally-spaced positions along and around the cylindrical wall. The arrangement of these ports 22 is such, as illustrated in Fig. 1, that when the first port 22 on the left is in registration with the first branch pipe line 14 on the left, so as to permit the passage of fluid from the interior of the cylinder out through this first branch pipe, passage of the fluid through all the other branch pipes will be shut off. Then a partial rotation of the cylindrical valve 17 (clockwise as viewed from the right in Fig. 1), a slight distance—thus rotation of 72° when there are five branch pipes and corresponding ports—will cause the first branch pipe line to be shut off and the second port 22 to be brought into registration with the second branch pipe line 14. Similarly a further rotation of 72° of the cylindrical valve 17 in the same direction will next cause the third branch pipe 14 to be opened, and so on.

Thus each 72° rotation of the cylindrical valve 17 causes one of the branch pipe lines to be opened, and only one of the branch pipe lines will be open at any one time. The relative positions of the ports 22 and the amount of rotation of the cylindrical valve 17 required for the opening of the branch pipes consecutively depends of course upon the number of the branch pipes which are connected to the housing 10.

A circular opening is provided in that portion of the housing wall which surrounds the enlarged chamber 12, and the inner end of a cylinder 23 is secured therein by welding or in any other suitable manner. The axis of this cylinder 23 is perpendicular to the axis common to the shaft 19, cylinder valve 17 and chamber 11. The upper or outer end of the cylinder 23 is closed by a cap 24.

A hydraulically operable piston 25 is slidably mounted in the cylinder 23. The piston 25 carries a suitable gasket or sealing ring 26 on its under side which is held in place by a washer and bolt, and the bottom or inner end of the bolt is formed into a forked mounting 27 which supports a pivot pin on which a link 28 is pivotally secured. The other end of the link 28 is pivotally connected to a pin 29 which is secured to and extends between a pair of spaced arms 30 and 31 rotatably supported on the shaft 19.

A ratchet wheel 32 (Figs. 2 and 3) is secured to the shaft 19 by a set screw or other suitable means, and the teeth on the perimeter of the ratchet wheel 32 are adapted to be engaged by a pawl 33 pivotally secured between the arms 30 and 31. The pawl is held in engagement with the ratchet wheel by a spring 34. The number of teeth on the ratchet wheel 32 corresponds to the number of the branch pipes 14 and the number of ports 22 in the cylindrical valve 17. A coil spring 35 is placed in the cylinder 23 and is held under compression between the upper or outer side of the piston 25 and the cap 24 at the outer end of the cylinder.

The operation of my branch pipe control, as thus far described, is as follows: The delivery of water or other fluid from the main pipe line 16 is controlled by any suitable shut-off valve (not shown), which main pipe line valve may be operated either manually, electrically, mechanically, or hydraulically. When this main pipe line valve is closed, preventing the delivery of the water or other fluid into the housing 10, the spring 35 in the cylinder 23 will cause the piston 25 to assume its lowest or inmost position, as illustrated in Figs. 1 and 2. Further inward movement of the piston is prevented by the engagement of the arms 30 and 31 and link 28 with the bottom of the chamber 12 as shown in Fig. 2. Let it be assumed that in this starting position the first port 22 on the left in Fig. 1 is in registration with the first branch pipe 14 as illustrated. The pawl 33 (Fig. 2) will be in engagement with one of the teeth of the ratchet wheel 32. Now when the shut-off valve in the main pipe line is open, the water or other fluid from the main pipe line will first pass into the cylindrical valve 17, and, while some of this fluid will pass into the first branch pipe line, which momentarily continues to remain open, some of the fluid will pass through the spider 18 and fill the chamber 12. The pressure of the fluid in the chamber 12 will move the piston 25 upwardly or outwardly against the force of the spring 35 to the position illustrated in Fig. 3. Since the pawl 33 continues to engage the same tooth of the ratchet wheel 32 this movement of the piston 25 will produce partial rotation of the ratchet wheel 32 (thus a rotation of 72° when the device is arranged as illustrated). The rotation of the ratchet wheel 32 will cause rotation of the cylindrical valve 17 to the same extent. The result of such rotation of the cylindrical valve 17 will be to close the first branch pipe line and open the second branch pipe line. As long as the pressure within the cylindrical valve 17 and within the chamber 12 continues, that is, as long as the shut-off valve in the main pipe line remains open, the piston will remain in the raised position of Fig. 3 and the water or fluid will pass through the second branch pipe line but will be prevented by the cylindrical valve 17 from passing through any of the other branch pipe lines.

A set screw 36, adjustably mounted in the cylinder cap 24 limits the upper or outward travel of the piston 25 and thus prevents the cylindrical valve 17 from being rotated too far by the travel of the piston.

When the shut-off valve in the main pipe line is again closed, shutting off the pressure within the cylindrical valve 17 and chamber 12, with one of the branch pipe lines remaining open, the spring 35 causes the piston 25 again to return to its lower or inner position and the pawl 33 will engage the next tooth of the ratchet wheel 32. When the shut-off valve in the main pipe line is next opened the operation of the device will be repeated. Since one of the branch pipe lines, namely the one through which the fluid was last permitted to pass, remains open when the shut-off valve in the main pipe line is closed, no appreciable fluid pressure will remain in the chamber 12 when the main shut-off valve is closed, and consequently only moderate tension is required on the part of the spring 35 to return the piston 25 to the starting position.

Figure 5:
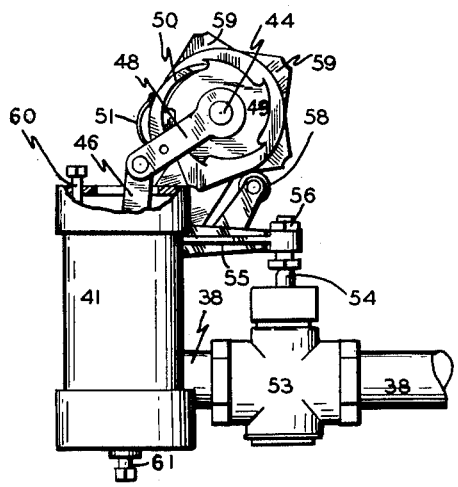
Fig. 5 is an end elevation taken on line 5—5 of Fig. 4.
Figure 6:
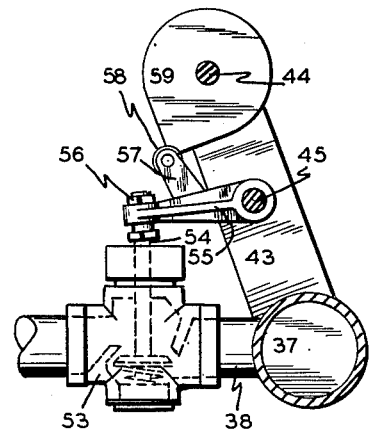
Fig. 6 is a transverse section on line 6—6 of Fig. 4 looking in the direction indicated by the arrows.

The modified device illustrated in Figs. 4, 5 and 6, which is also capable of carrying out my invention, has a main pipe-like housing 37 with which the branch pipe lines 38 are connected. At one end the housing 37 is formed into a suitable threaded connection 39 to which the main delivery pipe line (not shown) is attached. At the other end of the housing 37 a restricted passageway 40 leads to the bottom of a hydraulic cylinder 41 in which a hydraulic piston 42 is located.

A plurality of brackets 43, integral with, or welded to, the housing 37, extend upwardly, parallel to each other. The upper ends of these brackets 43 support bearings for a rotating shaft 44. A second shaft 45 is rigidly secured in the brackets 43 below and parallel to the rotating shaft 44.

The hydraulic piston 42 within the cylinder 41 is pivotally connected to a link 46. This link 46 extends through an elongated slot in the top of the cylinder 41 and the upper end of the link is pivotally mounted on a pin which is secured to and extends between a pair of arms 47 and 48. The arms 47 and 48 are rotatably supported on the shaft 44. A ratchet wheel 49, similar to ratchet wheel 32 of Figs. 2 and 3, previously described, is firmly secured to the shaft 44. A pawl 50 (Fig. 5) pivoted between the arms 47 and 48 and held against the ratchet wheel by a spring 51, engages the teeth of the ratchet 49. Thus with each upward movement of the piston 42 the ratchet wheel 49 and the shaft 44 are given a partial rotation, and the members are so arranged that the amount of rotation will equal the spacing of the ratchet teeth. Thus in the ratchet wheel 49 as shown in the drawings, there are five ratchet teeth. Consequently in the same device with each upward travel of the piston the ratchet wheel 49 and the shaft 44 will be rotated 72°. A set screw 60 in the top of the hydraulic cylinder 41 limits the upward travel of the piston and another set screw 61 at the bottom of the cylinder similarly limits the downward travel of the piston. A coil spring 52 is held under compression between the piston and the top of the cylinder. Thus when fluid under pressure fills the housing 37, a portion of the same will pass through the passageway 40 into the bottom of the hydraulic cylinder and exert an upward force against the piston 42 causing the piston to move upwardly against the force of the spring 52. When the fluid pressure in the housing 37 ceases, the spring 52 will return the piston to the lower position illustrated in Fig. 4.

Each of the branch pipe lines 38 has a valve (indicated in broken lines in Fig. 6) located within the valve housing 53 and normally held closed by a spring. A valve stem 54 extends up through the top of each of the housings 53 and each of the valves can be opened when sufficient downward pressure is exerted on its valve stem. Each valve stem 54 is connected to an arm 55. The arms 55 are pivotally mounted at one end on the stationary shaft 45, and are formed at the other end with an eye which extends over the top of the corresponding valve stem 54 and is adjustably held thereon by an adjustment nut 56. Furthermore each arm 55 has an integral upper extension 57 on the end of which a roller 58 is carried.

A plurality of cam members 59, one for each branch pipe, are secured on the shaft 44 and bear against the rollers 58 respectively. The rollers thus serve as cam followers. These cam members 59 are identical in shape, but, as indicated in Fig. 5, are so positioned that the cam projection on each of their perimeters will be staggered symmetrically so that only one cam member will act to depress its corresponding arm 55 at a time. Thus as apparent, with each partial rotation of the ratchet wheel 49 and shaft 44, one of the branch pipe valves will be open and the others will be closed.

The operation of my invention carried out in this modified form is substantially as previously described. When the main pipe line is connected to the housing 37 and the shut-off valve in such main pipe line (not shown) is open, the pressure of the fluid in the housing 37 and below the piston 42 will force the piston upwardly to the limit permitted by the set screw 60. This movement of the piston will rotate the shaft 44 and the cam members 59 (thus 72° in the device as illustrated) causing one of the branch pipe line valves to be open while the others are closed. When the shut-off valve in the main pipe line is closed, the branch pipe line valve previously opened continues to remain open and thus the fluid pressure in the housing 37 and below the piston 42 is relieved, whereupon the spring 52 returns the piston to the position illustrated in Fig. 4. When the shut-off valve in the main pipe line is again open the operation of the device is repeated and the next branch pipe line will be open, and so on. In this modified device which I have developed for carrying out my invention, the extent to which the valves in the branch pipe lines will be open consecutively can be independently adjusted by adjustment of the nuts 56 on the valve stems 54.

Thus in either of the devices which I have illustrated and described and which may be employed for the carrying out of my invention, the turning on and off of the valve in the main delivery pipe line automatically results in the delivery of the water, or other fluid, through each of the branch pipe lines successively, and the length of the time each branch pipe line remains open will depend entirely upon the length of time during which the shut-off valve in the main pipe is kept open.

Other modifications could also be made in the means by which my invention is carried out without departing from the principle of my invention, provided a similar piston, similarly operated by the fluid pressure from the main delivery pipe line, is so arranged with the various other members and elements in the device that the movement of the piston will result in the opening of the branch pipe lines separately and successively in the manner described.

I claim:

1. In a fluid distributor for the purpose described, a main housing chamber, said housing chamber having an inlet for connection to a main delivery pipe and a plurality of outlets for connection to branch pipe lines, rotatable valve means for opening and closing said outlets consecutively, a rotatable element on said valve means, a ratchet wheel connected with said element, a cylinder, a piston within said cylinder, one end of said cylinder connected to said main housing chamber so that fluid pressure in said cylinder will be the same as in said chamber and will cause said piston to move in one direction, spring means for returning said piston to starting position when said fluid pressure is relieved, a ratchet-engaging element operated by said piston and producing rotation of said ratchet wheel whenever said piston is moved by said fluid pressure, whereby when fluid from said inlet flows into said main housing chamber the pressure in said chamber will move said piston and cause rotation of said valve means to open one of said outlets, and when the fluid from said inlet stops flowing and said pressure in said main housing chamber is reduced the piston will return to starting position.

2. In a device of the character described, a main housing chamber, said housing chamber having an inlet for connection to a main delivery pipe and a plurality of outlets for connection to branch pipe lines, a rotatable cylindrical valve in said main housing chamber, ports in said valve arranged to register with said outlets consecutively when said valve is rotated, a ratchet wheel connected with said valve, a cylinder, a piston within said cylinder, one end of said cylinder connected to said main housing chamber so that fluid pressure in said cylinder will be the same as in said chamber and will cause said piston to move in one direction, spring means for returning said piston to starting position when said fluid pressure is relieved, a ratchet-engaging element operated by said piston and producing rotation of said ratchet wheel whenever said piston is moved by said fluid pressure, whereby when fluid from said inlet flows into said main housing chamber the pressure in said chamber will move said piston and cause rotation of said cylindrical valve to open one of said outlets, and when the fluid from said inlet stops flowing and said pressure in said main housing chamber is reduced the piston will return to starting position.

3. In a fluid distributor for the purpose described, a main housing chamber, said housing chamber having an inlet for connection to a main delivery pipe having a shut-off valve therein, said chamber having a plurality of outlets for connection to branch pipe lines, rotatable valve means for opening and closing said outlets consecutively, a rotatable element on said valve means, a ratchet wheel connected with said element, a cylinder, a piston within said cylinder, one end of said cylinder connected to said main housing chamber so that fluid pressure in said cylinder will be the same as in said chamber and will cause said piston to move in one direction, spring means for returning said piston to starting position when said fluid pressure is relieved, a ratchet-engaging element operated by said piston and producing rotation of said ratchet wheel whenever said piston is moved by said fluid pressure, and means limiting the stroke of said piston, whereby when said fluid is flowing from said inlet into said main housing chamber the pressure in said chamber will move said piston and cause rotation of said valve means to open one of said outlets, and when the fluid from said inlet stops flowing and said pressure in said main housing chamber drops the piston will return to starting position.

4. A sprinkling control of the character described including a main housing chamber, said housing chamber having an inlet at one end for connection to a main delivery pipe and a plurality of outlets for connection to branch pipe lines, a rotatable cylindrical valve in said main housing chamber, ports in said valve arranged to register with said outlets consecutively when said valve is rotated, a ratchet wheel connected with said valve, a cylinder, a piston within said cylinder, one end of said cylinder connected to said main housing chamber so that fluid pressure in said cylinder will be the same as in said chamber and will cause said piston to move in one direction, spring means for returning said piston to starting position when said fluid pressure is relieved, a ratchet-engaging element operated by said piston and producing rotation of said ratchet wheel whenever said piston is moved by said fluid pressure, and means limiting the stroke of said piston, whereby when fluid from said inlet flows into said main housing chamber the pressure in said chamber will move said piston and cause rotation of said cylindrical valve to open one of said outlets, and when the fluid from said inlet stops flowing and said pressure in said main housing chamber is reduced the piston will return to starting position.

HENRY G. FLEISCHHAUER.

References Cited in the file of this patent

UNITED STATES PATENTS

| Number | Name | Date |
| --- | --- | --- |
| 1,258,013 | Johnson | Mar. 5, 1918 |
| 1,739,787 | Doughty | Dec. 17, 1929 |
| 1,868,801 | Munz | July 26, 1932 |
| 1,992,877 | Monthan | Feb. 26, 1935 |
| 2,012,178 | Anderson | Aug. 20, 1935 |